United States Patent
Olarig et al.

(10) Patent No.: US 11,243,962 B2
(45) Date of Patent: Feb. 8, 2022

(54) METHOD OF DISTRIBUTED LOOKUP IN A STORAGE DEVICE AND SYSTEM EMPLOYING THE METHOD

(71) Applicant: Samsung Electronics Co., Ltd., Suwon-si (KR)

(72) Inventors: Sompong Paul Olarig, Pleasanton, CA (US); Ramdas P. Kachare, Cupertino, CA (US); William D. Schwaderer, Saratoga, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 15/961,755

(22) Filed: Apr. 24, 2018

(65) Prior Publication Data
US 2019/0266274 A1   Aug. 29, 2019

Related U.S. Application Data

(60) Provisional application No. 62/634,644, filed on Feb. 23, 2018.

(51) Int. Cl.
*G06F 16/2458* (2019.01)
*G06F 3/06* (2006.01)
*H04L 29/08* (2006.01)

(52) U.S. Cl.
CPC ........ *G06F 16/2471* (2019.01); *G06F 3/0659* (2013.01); *G06F 3/0679* (2013.01); *H04L 67/1097* (2013.01)

(58) Field of Classification Search
CPC .. G06F 1/206; G06F 13/4282; G06F 11/0751; G06F 13/4022; G06F 21/572; G06F 3/0604
See application file for complete search history.

(56) References Cited

U.S. PATENT DOCUMENTS

| | | | | |
|---|---|---|---|---|
| 9,658,983 | B1* | 5/2017 | Barber | G06F 16/2474 |
| 2008/0126404 | A1* | 5/2008 | Slik | G06F 16/1774 |
| 2011/0153798 | A1* | 6/2011 | Groenendaal | H04L 63/20 |
| | | | | 709/223 |
| 2016/0356639 | A1* | 12/2016 | Chou | H04Q 1/09 |
| 2017/0315882 | A1 | 11/2017 | Yammine et al. | |
| 2018/0004452 | A1 | 1/2018 | Ganguli et al. | |
| 2018/0101376 | A1* | 4/2018 | Olarig | G06F 8/63 |
| 2018/0314441 | A1* | 11/2018 | Suryanarayana | G06F 3/065 |
| 2019/0097878 | A1* | 3/2019 | Li | H04L 45/02 |

OTHER PUBLICATIONS

Malventano, Allyn, "Micro Launches SolidScale Platform Architecture, Consolidates NVMe in the Datacenter", https://www.pcper.com/news/Storage/Micron-Launches-SolidScale-Platform-Architecture-Consolidates-NVMe-Datacenter, May 24, 2017, 5 pages, PC Perspective.

* cited by examiner

*Primary Examiner* — Truong V Vo
(74) *Attorney, Agent, or Firm* — Lewis Roca Rothgerber Christie LLP

(57) ABSTRACT

A storage system includes a plurality of storage devices in a storage chassis and configured to store objects, an Ethernet switch in the storage chassis, a Baseboard Management Controller (BMC) connected to the storage devices, and a memory connected to the BMC. The plurality of storage devices include a query storage device and a candidate storage device, and the storage devices are connected to each other via the Ethernet switch in the storage chassis. The memory or the query storage devices is configured to store metadata corresponding to the objects stored in the candidate storage device.

20 Claims, 4 Drawing Sheets

METHOD OF DISTRIBUTED LOOKUP IN A STORAGE DEVICE AND SYSTEM EMPLOYING THE METHOD

CROSS-REFERENCE TO RELATED APPLICATION

This utility patent application claims priority to and the benefit of U.S. Provisional Patent Application Ser. No. 62/634,644, filed Feb. 23, 2018 and entitled "SYSTEM AND METHOD FOR SUPPORTING DISTRIBUTED LOOKUP AND CONTROL MECHANISMS FOR ESSD MACHINE LEARNING QUERIES," the entire content of which is incorporated herein by reference.

BACKGROUND

1. Field

Aspects of example embodiments of the present disclosure relate to a method of distributed lookup in a storage device and a system employing the method.

2. Related Art

The demand for high-capacity, high-performance storage devices have significantly increased recently due to, for example, increasing file sizes and an increasing amount of information (or data) that is being generated and stored. To provide both increased storage at a reasonable price and the ability to access data remotely and from various devices, cloud storage has become more popular. Cloud storage (e.g., remote storage) allows users to remotely store and access large amounts of data, giving companies freedom to acquire additional computing and storage resources on an as-needed basis without investing significant capital on hardware purchases and also giving individual users freedom to work on more compact devices while not being constrained by local storage limitations. However, these advancements have placed additional burdens on existing data centers, servers, and data access protocols by increasing the amount of data that is being transferred between the data center and the users.

In data centers, one of the most energy-intensive, and thus costly, activities is transferring data into and/or out of the data center to outside devices, including the users' computers or devices, etc. Accordingly, there is a desire to reduce or minimize the amount of data that is transferred into and/or out of the data center to reduce energy consumption and costs.

SUMMARY

The present disclosure is directed toward various embodiments of a method of distributed lookup in a storage device and a system employing the method.

According to one embodiment of the present disclosure, a storage system includes a plurality of storage devices in a storage chassis and configured to store objects, an Ethernet switch in the storage chassis, a BMC connected to the storage devices, and a memory connected to the BMC. The plurality of storage devices include a query storage device and a candidate storage device, and the storage devices are connected to each other via the Ethernet switch in the storage chassis. The memory or the query storage devices is configured to store metadata corresponding to the objects stored in the candidate storage device.

The storage devices may include solid-state devices.

The metadata may include information about one or more corresponding objects.

The Ethernet switch in the storage chassis may be configured to communicate with an external Ethernet switch.

The Ethernet switch in the storage chassis may be configured to communicate with an Ethernet switch in another storage chassis.

The query storage device may be configured to store the metadata, and the query storage device may be configured to store at least some of the objects.

In response to receiving an object storage query, the query storage device may be configured to identify which of the storage devices store objects conforming to the object storage query.

The memory may be configured to store the metadata, and the query storage device may be configured to store a backup of the metadata stored in the memory.

In response to receiving an object storage query, the BMC may be configured to identify which of the storage devices store objects conforming to the object storage query.

According to another embodiment of the present disclosure, a method of distributed lookup by using a storage chassis is provided. The storage chassis includes a query storage device and a plurality of candidate storage devices, an Ethernet switch connecting the query storage device and the candidate storage devices to each other, a BMC connected to the query storage device and the candidate storage devices, and a memory connected to the BMC. The candidate storage devices store a plurality of object. The method includes: receiving an object storage query to the query storage device from a host; forwarding the object storage query from the query storage device to the BMC; notifying the query storage device as to which of the candidate storage devices store objects conforming to the object storage query; and searching the candidate storage devices for objects that conform to the object storage query.

The query storage device and the candidate storage devices may include solid-state drives.

The method may further include: transmitting the objects that conform to the object storage query to the query storage device; and transmitting the objects that conform to the object storage query from the query storage device to the host.

The memory may store metadata corresponding to the objects stored in the candidate storage devices, the query storage device may instruct the candidate storage devices to perform the searching.

The query storage device may instruct the candidate storage devices to perform the searching.

At least one of the candidate storage devices that stores objects conforming to the object storage query may be in a different storage chassis.

According to another embodiment of the present disclosure, a method of distributed lookup by using a storage chassis is provided. The storage chassis includes a query storage device and a plurality of candidate storage devices storing a plurality of objects, an Ethernet switch connecting the query storage device and the candidate storage devices to each other, and a BMC connected to the query storage device and the candidate storage devices. The method includes: receiving an object storage query to the query storage device from a host; determining which of the candidate storage devices store objects conforming to the object storage query; and searching the candidate storage devices that store the conforming objects.

The method may further include transmitting the conforming objects to the query storage device via the Ethernet switch.

The query storage device and the candidate storage devices may include solid-state drives.

The query storage device may store metadata corresponding to the objects.

The determining which of the candidate storage devices store objects conforming to the object storage query may include determining that a storage device in another storage chassis stores objects conforming to the object storage query.

The method may further include transmitting operating information from the query storage device and the candidate storage devices to the BMC via a PCIe switch.

The query storage device may communicate with another storage device in another storage chassis via the Ethernet switch.

This summary is provided to introduce a selection of features and concepts of example embodiments of the present disclosure that are further described below in the detailed description. This summary is not intended to identify key or essential features of the claimed subject matter nor is it intended to be used in limiting the scope of the claimed subject matter. One or more of the described features according to one or more example embodiments may be combined with one or more other described features according to one or more example embodiments to provide a workable method or device.

DETAILED DESCRIPTION

Figure 1:
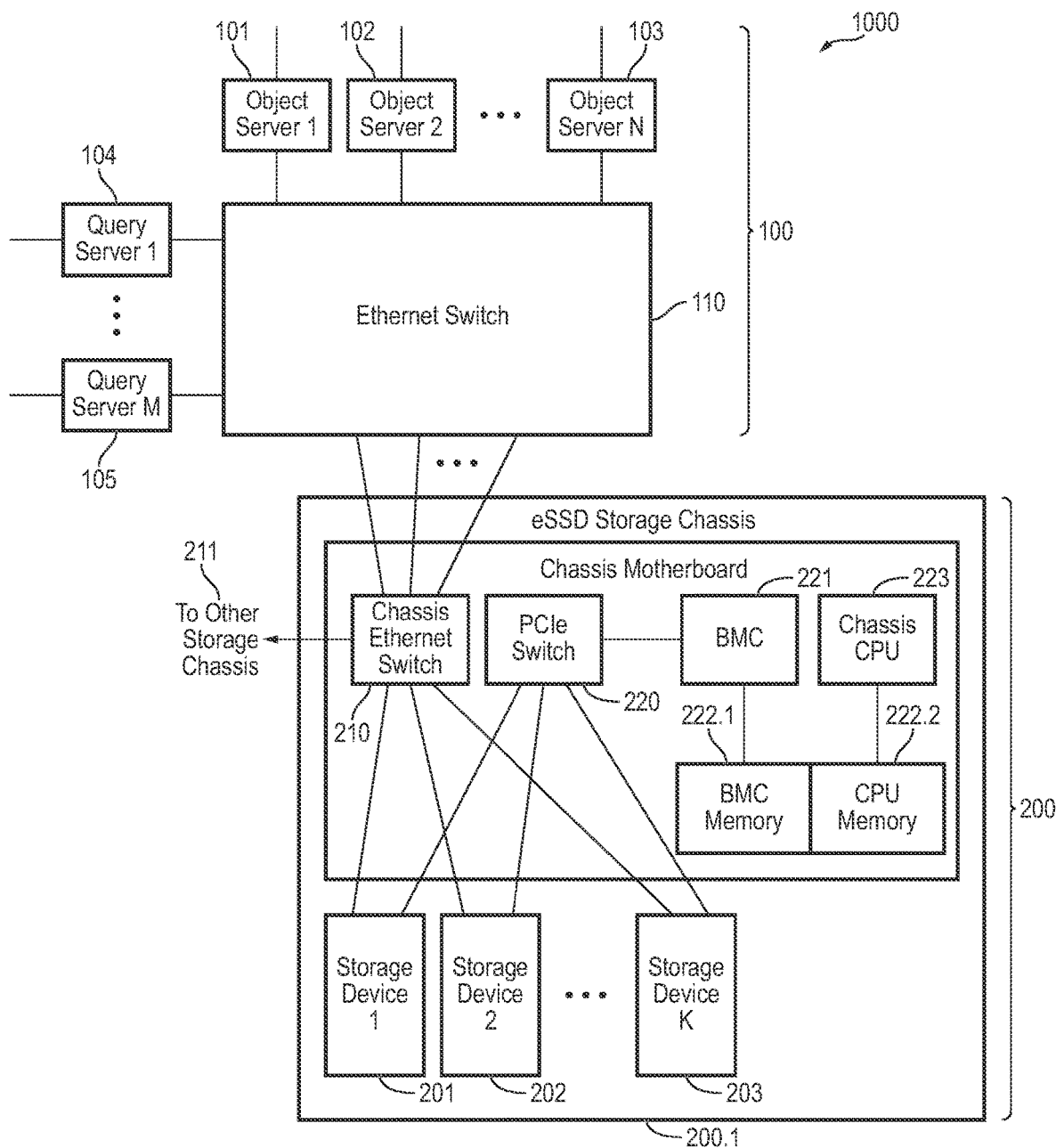
FIG. 1 illustrates a data storage environment according to an embodiment of the present disclosure.

The present disclosure is directed toward various embodiments of a method of distributed lookup in a storage device and a system employing the method. According to embodiments of the present disclosure, a storage chassis includes a plurality of storage devices and a BMC (Baseboard Management Controller). One or more of the storage devices and/or the BMC may store metadata and/or characteristic information of the data (e.g., objects) stored in the storage devices in the storage chassis. Thus, when a user, via a host (e.g., a remote host) or user device, submits an object storage query, the storage devices that are likely to have data conforming to the object storage request can be determined based on the metadata and/or characteristic information stored in the storage chassis and the conforming objects can be organized and sent to the user (e.g., sent to the host or user device) from the storage chassis as a collect object query response.

Hereinafter, example embodiments of the present disclosure will be described, in more detail, with reference to the accompanying drawings. The present disclosure, however, may be embodied in various different forms and should not be construed as being limited to only the embodiments illustrated herein. Rather, these embodiments are provided as examples so that this disclosure will be thorough and complete and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, and/or layers, these elements, components, and/or layers should not be limited by these terms. These terms are used to distinguish one element, component, or layer from another element, component, or layer. Thus, a first element, component, or layer described below could be termed a second element, component, or layer without departing from the scope of the present disclosure.

It will be understood that when an element or component is referred to as being "connected to" or "coupled to" another element or component, it may be directly connected or coupled to the other element or component or one or more intervening elements or components may also be present. When an element or component is referred to as being "directly connected to" or "directly coupled to" another element or component, there are no intervening element or component present. For example, when a first element is described as being "coupled" or "connected" to a second element, the first element may be directly coupled or connected to the second element or the first element may be indirectly coupled or connected to the second element via one or more intervening elements.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components but do not preclude the presence or addition of one or more other features, integers, steps, operations, elements, components, and/or groups thereof. That is, the processes, methods, and algorithms described herein are not limited to the operations indicated and may include additional operations or may omit some operations, and the order of the operations may vary according to some embodiments. As used herein, the term "and/or" includes any and all combinations of one or more of the associated listed items.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "example" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

A processor, central processing unit (CPU), graphics processing unit (GPU), field-programmable gate array (FPGA), hard disk drive (HDD), solid-state drive (SSD), and/or any other relevant devices or components according to embodiments of the present disclosure described herein may be implemented utilizing any suitable hardware (e.g., an application-specific integrated circuit), firmware, software, and/or a suitable combination of software, firmware, and hardware. For example, the various components of the processor, CPU, GPU, FPGA, HDD, and/or the SSD may be formed on (or realized in) one integrated circuit (IC) chip or on separate IC chips. Further, the various components of the processor, CPU, GPU, FPGA, HDD, and/or the SSD may be implemented on a flexible printed circuit film, a tape carrier package (TCP), a printed circuit board (PCB), or formed on the same substrate as the processor, CPU, GPU, FPGA, HDD, and/or SSD. Further, the described actions may be processes or threads, running on one or more processors (e.g., one or more CPUs, GPUs, FPGAs, etc.), in one or more computing devices, executing computer program instructions and interacting with other system components to perform the various functionalities described herein. The computer program instructions may be stored in a memory, which may be implemented in a computing device using a standard memory device, such as, for example, a random access memory (RAM). The computer program instructions may also be stored in other non-transitory computer readable media such as, for example, a CD-ROM, flash drive, HDD, SSD, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present disclosure.

Referring to FIG. 1, a data storage environment 1000 according to an embodiment of the present disclosure is illustrated. The data storage environment 1000 includes external servers 100 and a storage repository 200. The data storage environment 1000 may utilize the object storage (e.g., object-based storage) architecture, and an embodiment employing the object storage architecture will be described hereinafter, but the present disclosure is not limited thereto.

In the object storage architecture, object servers, discussed further below, allow client machines (e.g., remote hosts or user devices) to store and retrieve data (e.g., data objects or objects) that reside within (e.g., are stored by) a data repository (e.g., an object storage repository). The data repository may include one or more storage chassis, and each of the storage chassis includes a plurality of storage devices on which the objects are stored.

The external servers 100 include, in one embodiment, a plurality of object servers 1, 2, ..., N indicated by 101-103, a plurality of query servers 1, ..., M indicated by 104 and 105, and an Ethernet switch 110. While a plurality of object servers 101-103 and a plurality of query servers 104, 105 are illustrated as part of the external servers 100, the object servers and the query servers may be services running on one or more computers (or servers, etc.) and may not be physically separate servers. Further, a single computer (or server) may alternate between acting as an object server, which provides data to the storage repository 200 for storage, and a query server, which query the storage repository 200 to retrieve requested data. In some embodiments, a single computer (or server) may concurrently or simultaneously act as both an object server and a query server.

Each of the object servers 101-103 and the query servers 104, 105 are connected to the storage repository 200 via an Ethernet switch 110. However, the present disclosure is not limited to connections based on the Ethernet interface and other, suitable connection interfaces may be used. In FIG. 1, the Ethernet switch 110 is shown as being connected to the storage repository 200 via three Ethernet cables. However, the present disclosure is not limited thereto and any suitable number of Ethernet cables may be used to connect the Ethernet switch 110 to the storage repository 200, with an increasing number of Ethernet cables providing increased bandwidth between the Ethernet switch 110 and the storage repository 200.

The storage repository 200 includes one or more storage chassis 200.1. The storage chassis 200.1 includes a plurality of storage devices 1, 2, ..., K indicated by 201-203, a chassis Ethernet switch 210, and a chassis controller including a PCIe (Peripheral Component Interconnect Express) switch 220, a BMC (Baseboard Management Controller) 221, memory 222.1 and 222.2, and a chassis CPU 223. In one embodiment, the storage devices 201-203 may be solid-state drives (SSDs). The memory 222.1 and 222.2 may be DRAM (Dynamic Random Access Memory). The BMC memory 222.1 may be dedicated to the BMC 221, and the CPU memory 222.2 may be dedicated to the chassis CPU 223. In some embodiments, the chassis CPU 223 may be omitted, with the BMC 221 performing the control functions for the storage devices and for the chassis Ethernet switch 210.

In some embodiments, the storage devices 201-203 may be Ethernet-connected SSDs (eSSDs) that receive and transmit data using an Ethernet interface. Hereinafter, an embodiment in which the storage devices 201-203 are Ethernet-connected SSDs will be described, but the present disclosure is not limited thereto.

The storage repository 200 may include another (or second) storage chassis that is connected to the first storage chassis 200.1 via an Ethernet connection 211. In this way, a plurality of the storage chassis may be connected to each other (e.g., daisy-chained together) to increase the amount of storage available in the storage repository 200 and/or provide redundancy for the data stored in the storage repository in the event of a device failure, power failure, etc. Further, the Ethernet switch 110 may also be connected to the second storage chassis via an Ethernet connection to improve transfer rates, etc. In some embodiments, the second storage chassis may be located relatively far from the first storage chassis 200.1, and the first and second storage chassis may be connected to each other over the Internet, for example. However, as discussed above, in some embodiments the storage repository 200 may include only a single storage chassis 200.1.

In the storage chassis 200.1, each of the storage devices 201-203 are connected to the chassis Ethernet switch 210 via an Ethernet connection and are also connected to a PCIe switch 220 via a PCIe connection. The storage devices 201-203 may communicate with each other via the chassis Ethernet switch 210 and/or the PCIe switch 220. The PCIe connection may be used as a control plane or connection (e.g., a management interface) that allows the storage devices 201-203 to report various status to the BMC 221 for monitoring and reporting, as some examples. The PCIe connection is generally not used for transmitting or receiving stored data. By using the PCIe switch 220 to communicate with each other via the control plane, the storage devices 201-203 may not utilize bandwidth available on the Ethernet interface or data plane for data transfer into and out of the storage chassis 200.1 when communicating with each other.

In some embodiments, the storage devices 201-203 may manage their own internal storage. For example, when one of the storage devices 201-203 exhausts its storage capacity, it may request overflow storage on another one of the storage devices 201-203 or on a different storage device in another storage chassis. To request overflow storage, the storage device may contact the BMC 221 via the PCIe interface, and the BMC 221, which maintains information as to remaining storage capacity of the storage devices 201-203, may assign a portion of another one of the storage device to the exhausted storage device as overflow storage. In some cases, the BMC 221 may maintain information as to remaining storage capacity of storage devices in other storage chassis via the Ethernet connection 211 and may assign a portion of another storage device in a different storage chassis as overflow storage.

In the object storage architecture, data is stored as objects, and each object has corresponding metadata and characteristic information. The metadata may include information about the corresponding object. For example, when the object is a picture file, the metadata may describe the subject of the picture file, such as if the picture is a picture of a dog. Recently, machine learning algorithms have been employed to automatically process, classify, and/or organize data in storage repositories, and information gleaned from objects by such machine learning algorithms may be stored in the metadata. The characteristic information may include, for example, what type of file the object is, such as a JPEG, GIF, MP3, etc.

Conventionally, object metadata and characteristic information is stored in query servers separate from the storage repository, and each query server maintains a database of where certain objects are stored. For example, the query servers store data indicating on which storage device and/or storage chassis an object is stored. When a host generates an object storage query (e.g., a retrieval request), the query servers interrogate the various storage chassis and storage devices in the storage chassis to locate and retrieve objects that conform to the object storage query. As some examples, the object storage query may reference particular metadata field (e.g., pictures of dogs) or characteristics information (e.g., JPEG file type) and/or may include an example object with specified object conformance (e.g., a picture of a dog requesting retrieval of other pictures of dogs). In response to the object storage query, the query server communicates with various different storage chassis or storage devices based on where conforming objects (e.g., objects that conform to the object storage query) are located, and the query server collects the conforming objects to be passed along to the host as an object response. This transfer of objects from the storage repository to the requesting query server is energy intensive and uses bandwidth between the query server and the storage repository.

According to a first embodiment, the storage devices 201-203 in the storage repository 200 report metadata and characteristic information of stored objects (e.g., objects stored in one or more of the storage devices 201-203) to the BMC 221 via the chassis Ethernet switch 210 and/or the PCIe switch 220. The BMC 221 may store the characteristic information and/or metadata of the objects on the storage devices 201-203 in the corresponding storage chassis 200.1. For example, the BMC 221 may store information indicating which of the storage devices 201-203 are storing certain types of files, etc. This information may be stored by the BMC 221 on the BMC memory 222.1; however, in other embodiments, the BMC 221 may store this information i one or more of the storage devices 201-203. In some embodiments, the BMC 221 may store this information in the BMC memory 222.1 but may also store a backup of this information in one or more of the storage devices 201-203 to ensure the information is not lost during, for example, a power outage or device failure. Further, the storage device 201-203 may report object deletions to the BMC 221 so that unnecessary lookups based on deleted objects, further described below, may be avoided.

In other embodiments, the chassis CPU 223 may be used to store the characteristic information and/or metadata of the stored objects. However, because the BMC 221 may already be tracking the states of the connected storage devices 201-203, including their on/off states, capacities, remaining capacities, etc., storing the information on the BMC 221 may reduce communication between the BMC 221 and the chassis CPU 223 and provide faster response times to object storage queries.

Figure 2:
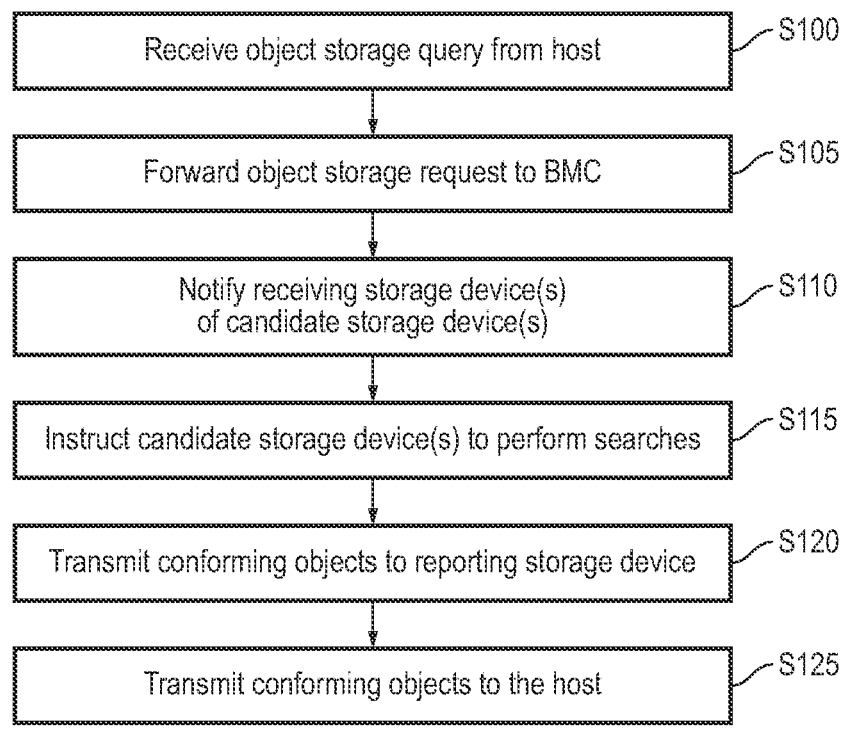
FIG. 2 illustrates a method of distributed lookup employed in the data storage environment shown in FIG. 1.

Referring to FIGS. 1 and 2, according to an embodiment, a host generates an object storage query (e.g., a retrieval request), and the object storage query is directed to and received by one or more of the storage devices 201-203 in the storage repository 200 via the Ethernet interface (S100). In some embodiments, the object storage query may be directed to storage devices in a plurality of storage chassis of the storage repository 200 via the Ethernet interface. As discussed above, the object storage query may reference object metadata, characteristic information, may be an example result candidate, etc. In this example, the storage device 201 will be considered the receiving storage device, but the present disclosure is not limited thereto.

The receiving storage device 201 then forwards the received object storage query to the corresponding BMC 221 via the PCIe switch 220 (S105). In other embodiments, the receiving storage device 201 may forward the received object storage query to the corresponding BMC 221 via the chassis Ethernet switch 210, or may select which of the chassis Ethernet switch 210 or the PCIe switch 220 to use based on bandwidth availability. The receiving storage device 201 may be referred to as the reporting storage device after it reports the received object storage query to the BMC 221.

The BMC 221 then notifies the receiving (or reporting) storage device 201 of the various storage devices (e.g., any of the storage devices 201-203 in the storage chassis 200.1 or external storage devices in other storage chassis of the storage repository 200) that may store conforming objects responsive to the object storage query (S110). The storage devices that may store conforming objects responsive to the object storage query may be referred to as candidate storage devices. In this example, storage devices 202, 203 will be considered the candidate storage devices, but the present disclosure is not limited thereto. In some cases, the receiving (or reporting) storage device 201 may also be a candidate storage device.

The reporting storage device 201 then instructs the candidate storage devices 202, 203 to perform searches based on the object storage query (S115). When external storage devices in other storage chassis are identified by the BMC 221 as being candidate storage devices, the reporting storage device 201 may instruct those external candidate storage devices to perform searches via the Ethernet connection 211 to the other storage chassis. The candidate storage devices 202, 203 then report back to the reporting storage device 201 any objects that conform to the object storage query (S120). This reporting may occur over the chassis Ethernet switch 210 and/or the PCIe switch 220 in the storage chassis 200.1.

After the reporting storage device 201 receives a communication from each of the candidate storage devices 202, 203 including either conforming objects (i.e., objects conforming to the object storage query) or a message indicating that no conforming objects were located, for example, when previously-conforming objects were deleted and the deletion was not reported to the BMC 221, the reporting storage device 201 returns the conforming objects to the host as a response to the object storage query (S125).

In other embodiments, each of the storage devices 201-203 may store the metadata and the characteristic information of the objects stored in all of the storage devices 201-203 instead of or in addition to the BMC 221 (e.g., the BMC 221 in conjunction with the BMC memory 222.1) storing this information. Because the metadata and characteristic information of an object is much smaller than the object itself, the storage penalty for each storage device 201-203 storing the metadata and characteristic information for the objects stored in all of the storage devices 201-203 is relatively minor. In this embodiment, the communication between the receiving (or reporting) storage device 201 and the BMC 221 may be omitted as the receiving storage device 201 determines which of the storage devices 201-203 are candidate storage devices based on the object storage query. By omitting the communication with the BMC 221, a response time to the object storage query may be shortened.

When the storage repository 200 is used with the query servers 104, 105 as shown in FIG. 1, the query servers 104, 105 may pass through the object storage query from a host to the storage chassis 200.1. For example, different from the above-described conventional data storage environment, in embodiments of the present disclosure, object metadata and characteristic information is stored locally on the storage chassis 200.1. As such, the amount of information transmitted to and from the storage chassis 200.1 is reduced and query speeds are improved. When the storage chassis 200.1 is connected to a conventional query server, the conventional query server may pass along the object storage query to the storage chassis 200.1 without interrogating the individual storage devices as in the conventional data storage environment. In this way, the storage chassis 200.1 according to embodiments of the present disclosure can be used with conventional query servers, easing the transition for companies and network administrators.

Figure 3:
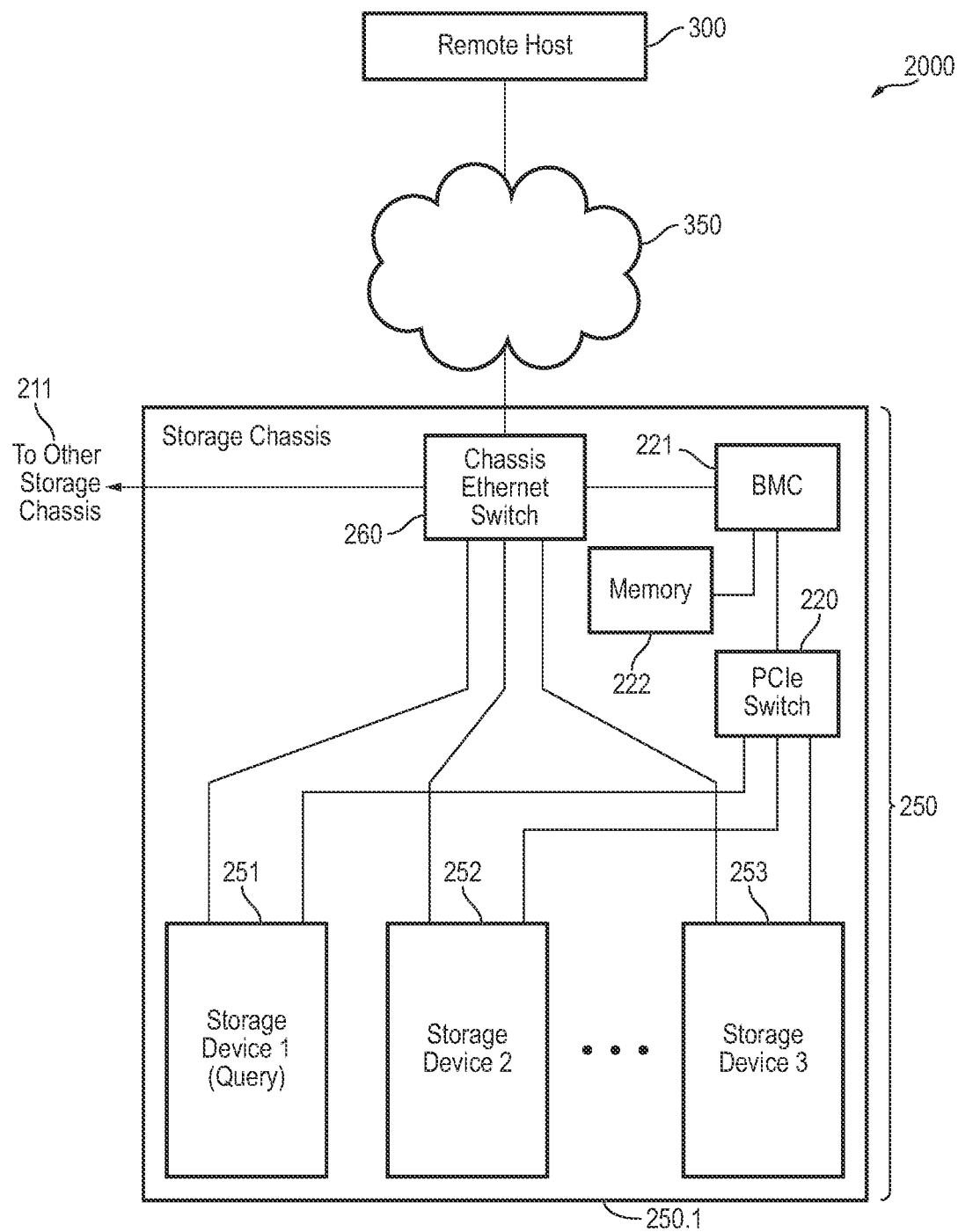
FIG. 3 illustrates a data storage environment according to another embodiment of the present disclosure.

Referring to FIG. 3, according to another embodiment, a data storage environment 2000 includes a storage repository 250 and a remote host 300. The storage repository 250 includes one or more storage chassis 250.1. The storage chassis 250.1 includes a plurality of storage devices 1, 2, . . . , K, indicated by 251-253 and a chassis Ethernet switch 260. The storage devices 251-253 are each connected to the chassis Ethernet switch 260 and may be, as described above, solid-state drives (SSD) and, in some embodiments, Ethernet SSDs (eSSDs). Similar to the storage chassis 200.1 shown in FIG. 1, the storage chassis 250.1 also includes the PCIe switch 220 connected to each of the storage devices 251-253, the BMC 221 connected to the PCIe switch 220, and the memory 222 connected to the BMC 221. For ease of description, the PCIe switch 220, the BMC 221, and the memory 222, which is substantially similar to the BMC memory 222.1 described above with respect to the embodiment shown in FIG. 1, may not be described again.

The storage chassis 250.1 omits the chassis CPU 223 of the storage chassis 200.1 shown in FIG. 1. However, as described above with reference to the storage chassis 200.1, the chassis CPU 223 may be optionally included in the storage chassis 250.1 or may be omitted.

The storage chassis 250.1 is connected to a remote host (e.g., a host or user device) 300 via a network connection 350. The network connection 350 may be, for example, the Internet, a local area network, or the like. Different from the embodiment shown in FIG. 1, the storage chassis 250.1 is connected to the remote host 300 without imposition of a query server. However, the storage chassis 250.1 may be connected to one or more query servers, such as is shown in FIG. 1. Similarly, the storage chassis 200.1 shown in FIG. 1 may be connected to the remote host 300 without imposition of the query servers 104, 105.

Figure 4:
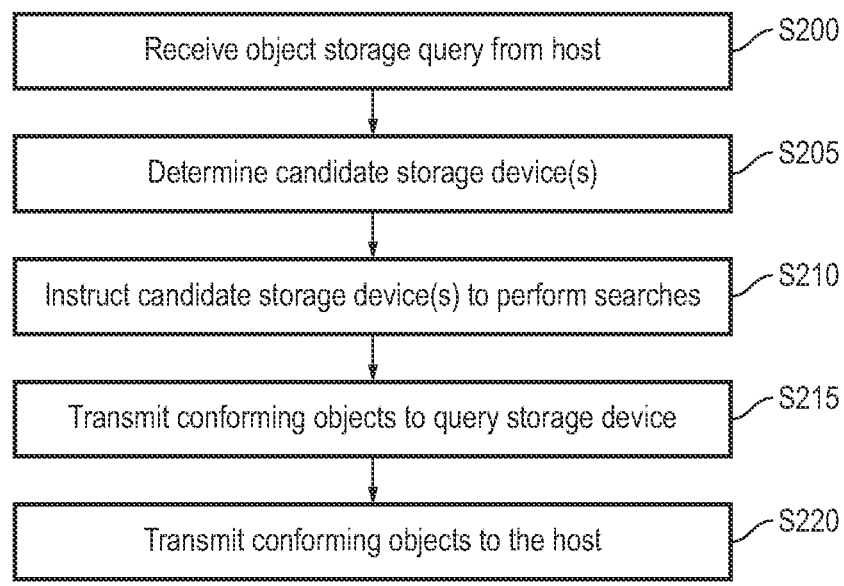
FIG. 4 illustrates a method of distributed lookup employed in the data storage environment shown in FIG. 3.

Referring to FIGS. 3 and 4, according to another embodiment, the remote host 300 generates an object storage query and transmits the object storage query to the storage chassis 250.1 via the network connection 350. The object storage request is then received by the storage chassis 250.1 (S200).

The object storage request is then directed to the one or more of the storage devices 251-253 that act as the query server. For example, one of the storage devices 251-253 may act as a query server by storing metadata and characteristic information of all of the objects stored in the storage devices 251-253. Different from the storage device 200.1 shown in FIG. 1, in which the BMC 221 stores the metadata and characteristic information of the stored objects, in the storage chassis 250.1 shown in FIG. 3, one of the storage devices 251-253 acts as the query server. In this example, the storage device 251 will be considered the query server (or query storage device), but the present disclosure is not limited thereto.

When the storage device 251 is the query server (or query storage device), the object storage query is directed to the storage device 251 by the chassis Ethernet switch 260. Then, the storage device 251 determines which of the storage devices 251-253 are candidate storage devices based on the object storage query (S205). In this example, the storage devices 252, 253 will be considered the candidate storage devices, but the present disclosure is not limited thereto. For example, in some cases, the storage device (the query storage device) 251 may also store objects. That is, the query storage device 251 may also act as a storage device for storing objects. Because the size of the metadata and the characteristic information of an object may be substantially less than the size of the object itself, the query storage device 251 may have a relatively large amount of unused storage space or capacity. In some embodiments, the query storage device 251 may act as overflow storage to be assigned by the BMC 221 when the other storage devices 252, 253 in the storage chassis 250.1 become full.

The storage device 251 then instructs the candidate storage devices 252, 253 to perform searches therein for objects conforming to the object storage query (S210). The candidate storage devices 252, 253 then report either the conforming objects found during the search or a message indicating that no conforming objects were located during the search (S215). This reporting may occur via the chassis Ethernet switch 260 and/or the PCIe switch 220. After all of the candidate storage devices 252, 253 have reported, the storage device 251 will return the conforming objects to the remote host 300 as a collective object response (S220).

In this embodiment, because one of the storage devices 251-253 acts as the query server, the object storage query may be handled more quickly as the step(s) of communicating with the BMC 221 to complete the object storage query may be omitted. Further, conventional query servers outside of (e.g., remote from) the storage chassis 250.1 may also be omitted, thereby simplifying the data storage environment 2000.

In addition, recent developments have provided machine learning capabilities in storage devices, such as SSDs. Accordingly, data may now be processed and categorized by using machine learning algorithms on the storage devices themselves rather than having the data transmitted to a computer, server, etc. remote from the storage device for processing and categorization. By conducting the processing and categorization on the storage devices, the amount of data transmitted into and out of the storage devices is reduced. The addition of the features of the embodiments of the present disclosure further reduce the amount of data that is transmitted into and out of the storage chassis by storing the metadata for the objects on local devices (e.g., on devices in the storage chassis), such as the storage devices themselves or the BMC.

Although the present disclosure has been described with reference to the example embodiments, those skilled in the art will recognize that various changes and modifications to the described embodiments may be made, all without departing from the spirit and scope of the present disclosure. Furthermore, those skilled in the various arts will recognize that the present disclosure described herein will suggest solutions to other tasks and adaptations for other applications. It is the applicant's intention to cover, by the claims herein, all such uses of the present disclosure, and those changes and modifications which could be made to the example embodiments of the present disclosure herein chosen for the purpose of disclosure, all without departing from the spirit and scope of the present disclosure. Thus, the example embodiments of the present disclosure should be considered in all respects as illustrative and not restrictive, with the spirit and scope of the present disclosure being indicated by the appended claims and their equivalents.

What is claimed is:

1. A storage system comprising:
    storage devices in a storage chassis, the storage devices being configured to store objects;
    a controller in the storage chassis and connected to the storage devices; and
    a memory in the storage chassis and connected to the controller, the memory being different from the storage devices,
    wherein the memory is associated with the controller and is configured to store metadata corresponding to the objects stored in the storage devices,
    wherein the controller is configured to update the metadata stored on the memory in response to a change in at least one of the objects stored on the storage devices,
    wherein, in response to receiving an object storage query, the storage system performs a search of the metadata on the memory to determine a storage device from among the storage devices that stores at least one object conforming to the object storage query, and
    wherein, in response to the search of the metadata, the controller identifies the storage device that stores the at least one object conforming to the object storage query.

2. The storage system of claim 1, wherein the storage devices comprise solid-state devices.

3. The storage system of claim 2, wherein the metadata comprises information about one or more corresponding objects.

4. The storage system of claim 2, further comprising a switch in the storage chassis,
    the switch is configured to communicate with an external device, the controller, and the storage devices.

5. The storage system of claim 4, wherein the switch is configured to communicate with another switch in another storage chassis.

6. The storage system of claim 4, wherein the switch is an Ethernet switch.

7. The storage system of claim 2, wherein the storage devices further comprise a query storage device, the query storage device is configured to store the metadata, and
    wherein the query storage device is configured to store at least one of the objects.

8. The storage system of claim 7, wherein, in response to receiving the object storage query, the query storage device is configured to identify a storage device of the storage devices that stores at least one of the objects conforming to the object storage query.

9. The storage system of claim 2, wherein the storage devices further comprise a query storage device,
    wherein the memory is configured to store the metadata, and
    wherein the query storage device is configured to store a backup of the metadata stored in the memory.

10. A method of distributed lookup by using a storage chassis comprising: storage devices storing objects; a controller; and a memory different from the storage devices and associated with the controller, the controller being connected to the memory and the storage devices, the memory storing metadata corresponding to the objects stored in the storage devices, the method comprising:
    receiving, by the controller, an object storage query from a host;
    searching the metadata on the memory to identify one or more storage devices from among the storage devices that stores at least one object conforming to the object storage query; and
    searching the one or more identified storage devices for the at least one object that conforms to the object storage query.

11. The method of claim 10, wherein the storage devices comprise solid-state drives.

12. The method of claim 11, further comprising:
    transmitting the at least one object that conforms to the object storage query from the one or more identified storage devices to the host.

13. The method of claim 11, wherein the memory stores the metadata corresponding to the objects stored in the storage devices, and
    wherein the controller instructs the storage devices to perform the searching.

14. The method of claim 10, wherein the searching the one or more identified storage devices for the at least one object that conforms to the object storage query comprising searching only the one or more identified storage devices for the at least one object that conforms to the object storage query.

15. A method of distributed lookup by using a storage chassis, the storage chassis comprising: storage devices storing objects and a memory separate from the storage devices, the memory storing metadata corresponding to the objects stored on the storage devices; and a controller connected to the memory and the storage devices, the method comprising:
- receiving an object storage query to the controller from a host;
- searching the metadata stored on the memory to identify one or more storage devices from among the storage devices that stores at least one object conforming to the object storage query; and
- searching the one or more identified storage devices based on the results of the searching of the metadata for the at least one conforming object.

16. The method of claim 15, further comprising transmitting the at least one conforming object to the host via a switch.

17. The method of claim 16, wherein the storage devices comprise solid-state drives.

18. The method of claim 17, further comprising identifying a storage device in another storage chassis as storing at least one object conforming to the object storage query.

19. The method of claim 17, further comprising transmitting operating information from the storage devices to the controller via a secondary switch.

20. The method of claim 17, wherein the controller communicates with another storage chassis via the switch.

* * * * *